(12) United States Patent
Su et al.

(10) Patent No.: US 12,475,308 B2
(45) Date of Patent: Nov. 18, 2025

(54) VECTOR SPACE MODEL FOR FORM DATA EXTRACTION

(71) Applicant: National Research Council of Canada, Ottawa (CA)

(72) Inventors: Jiang Su, Ottawa (CA); Hongyu Guo, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 377 days.

(21) Appl. No.: 18/012,293

(22) PCT Filed: Jun. 30, 2021

(86) PCT No.: PCT/CA2021/050901
§ 371 (c)(1),
(2) Date: Dec. 22, 2022

(87) PCT Pub. No.: WO2022/000089
PCT Pub. Date: Jan. 6, 2022

(65) Prior Publication Data
US 2023/0274085 A1    Aug. 31, 2023

Related U.S. Application Data

(60) Provisional application No. 63/046,636, filed on Jun. 30, 2020.

(51) Int. Cl.
*G06F 17/00* (2019.01)
*G06F 40/186* (2020.01)
(Continued)

(52) U.S. Cl.
CPC .......... *G06F 40/186* (2020.01); *G06F 40/284* (2020.01); *G06F 40/30* (2020.01); *G06V 30/413* (2022.01)

(58) Field of Classification Search
CPC ...... G06F 40/186; G06F 40/284; G06F 40/30; G06F 40/177; G06F 16/28; G06V 30/413
See application file for complete search history.

(56) References Cited

U.S. PATENT DOCUMENTS

| 5,123,057 A | 6/1992 | Verly et al. |
| 7,590,647 B2 | 9/2009 | Srinivasan et al. |

(Continued)

FOREIGN PATENT DOCUMENTS

| CN | 105956012 A | 9/2016 |
| CN | 109800317 A | 5/2019 |
| CN | 112163428 A | 1/2021 |

OTHER PUBLICATIONS

Tsvetanka Georgieva-Trifonova Text Classification Based on Enriched Vector Space Model. In Proceedings of the 18th International Conference on Computer Systems and Technologies. Association for Computing Machinery, 103-110. <https://doi.org/10.1145/3134302.313>, Jun. 2017.*

(Continued)

*Primary Examiner* — Greta L Robinson
(74) *Attorney, Agent, or Firm* — Aird & McBurney LP

(57) ABSTRACT

A computer-implemented method for detecting attribute value pairs from corpus data using a computer comprising a processor and a computer readable medium comprising instructions executable by the processor to at least: receive the corpus data comprising at least one pair; detect a layout template of the at least one pair; measure the merit of the layout template by determining at least one of (a) relative magnitudes of content probabilities based on a probability of the contents of an attribute cell and a probability of a corresponding value cell, (b) the validity of a name-value pair, or (c) the pointwise mutual information of a frequency matrix M corresponding to a sparse vector capturing context (Continued)

information of a word; and output detected attribute value pairs.

20 Claims, 4 Drawing Sheets

(51) Int. Cl.
  *G06F 40/284* (2020.01)
  *G06F 40/30* (2020.01)
  *G06V 30/413* (2022.01)

(56) References Cited

U.S. PATENT DOCUMENTS

| | | | | |
|---|---|---|---|---|
| 9,189,742 | B2* | 11/2015 | London | G06N 5/04 |
| 9,311,371 | B2 | 4/2016 | Mohan et al. | |
| 10,235,437 | B2 | 3/2019 | Diwan et al. | |
| 11,151,175 | B2* | 10/2021 | Lourentzou | G06F 16/313 |
| 2004/0078755 | A1 | 4/2004 | Shinjo et al. | |
| 2006/0224952 | A1* | 10/2006 | Lin | G06F 40/143 |
| | | | | 715/209 |
| 2010/0174739 | A1 | 7/2010 | Mons et al. | |
| 2015/0142807 | A1 | 5/2015 | Hofmann et al. | |
| 2015/0227505 | A1 | 8/2015 | Morimoto | |
| 2017/0091274 | A1 | 3/2017 | Guo et al. | |
| 2017/0185577 | A1* | 6/2017 | Chen | G06F 40/106 |
| 2017/0235735 | A1 | 8/2017 | Ignatyev et al. | |
| 2017/0322964 | A1 | 11/2017 | Wang et al. | |
| 2019/0163817 | A1 | 5/2019 | Milenova et al. | |
| 2021/0126832 | A1* | 4/2021 | Das | H04L 41/20 |

OTHER PUBLICATIONS

International Search Report issued in International Application No. PCT/CA2021/050901, Sep. 7, 2021, 6 pages.
Written Opinion of the International Searching Authority issued in International Application No. PCT/CA2021/050901, Sep. 7, 2021, 6 pages.
Cafarella, M. J., et al. "Web-scale extraction of structured data." SIGMOD Record 37.4 (2008): 55-61.
Yin, X., et al. "FACTO: a fact lookup engine based on web tables." Proceedings of the 20th International Conference on World Wide Web (2011): 507-516.
Crestan, E., and Pantel, P. "Web-scale table census and classification." Proceedings of the Fourth ACM International Conference on Web Search and Data Mining (2011): 545-554.
Turney, P. D., and Pantel, P. "From frequency to meaning: Vector space models of semantics." Journal of Artificial Intelligence Research 37 (2010): 141-188.
Mulwad, V., et al. "Generating linked data by inferring the semantics of tables." Proceedings of the First International Workshop on Searching and Integrating New Web Data Sources (2011): 17-22.
Jauhar, S. K., et al. "Tables as semi-structured knowledge for question answering." Proceedings of the 54th Annual Meeting of the Association for Computational Linguistics vol. 1: Long Papers (2016): 474-483.
Sun, H., et al. "Table cell search for question answering." Proceedings of the 25th International Conference on World Wide Web (2016): 771-782.
Embley, D. W., et al. "Table-processing paradigms: a research survey." International Journal of Document Analysis and Recognition (IJDAR) 8.2 (2006): 66-86.
Hurst, M. F. "The interpretation of tables in texts." Ph.D. Dissertation, University of Edinburgh, 2000.
Chen, H-H., et al. "Mining tables from large scale HTML texts." Coling 2000 vol. 1: Proceedings of the 18th International Conference on Computational Linguistics (2000).
Penn, G., et al. "Flexible web document analysis for delivery to narrow-bandwidth devices." Sixth International Conference on Document Analysis and Recognition (2001).
Wang, Y., and Hu, J. "A machine learning based approach for table detection on the web." Proceedings of the 11th International Conference on World Wide Web (2002).
Cafarella, M. J., et al. "Uncovering the relational web." 11th International Workshop on the Web and Databases (2008).
Eberius, J., et al. "Building the dresden web table corpus: A classification approach." International Symposium on Big Data Computing (2015): 41-50.
Lehmberg, O., et al. "A large public corpus of web tables containing time and context metadata." Proceedings of the 25th International Conference Companion on World Wide Web (2016): 75-76.
Lautert, L. R., et al. "Web table taxonomy and formalization." SIGMOD Record 42.3 (2013): 28-33.
Yoshida, M., et al. "A method to integrate tables of the world wide web." Proceedings of the International Workshop on Web Document Analysis (WDA 2001) (2001): 31-34.
Tengli, A., et al. "Learning table extraction from examples." Coling 2004: Proceedings of the 20th International Conference on Computational Linguistics (2004).
Fang, J., et al. "Table header detection and classification," Proceedings of the Twenty-Sixth AAAI Conference on Artificial Intelligence (2012): 599-605.
Church, K., and Hanks, P. "Word association norms, mutual information, and lexicography." Computational Linguistics 16.1 (1990): 22-29.
Bullinaria, J. A., and Levy, J. P. "Extracting semantic representations from word co-occurrence statistics: A computational study." Behavior Research Methods 39.3 (2007): 510-526.
Chen, S. F., and Goodman, J. "An empirical study of smoothing techniques for language modeling." Computer Speech & Language 13.4 (1999): 359-394.
Hall, M., et al. "The WEKA data mining software: an update." SIGKDD Explorations Newsletter 11.1 (2009): 10-18.
Zhang, H. "The optimality of naive bayes, flairs conference." Proceedings of the Seventeenth International Florida Artificial Intelligence Research Society Conference (2004).
Heafield, K. "KenLM: faster and smaller language model queries," Proceedings of the EMNLP 2011 Sixth Workshop on Statistical Machine Translation (2011).
Mikolov, T., et al. "Recurrent neural network based language model." Interspeech 2.3 (2010): 1-24.

* cited by examiner

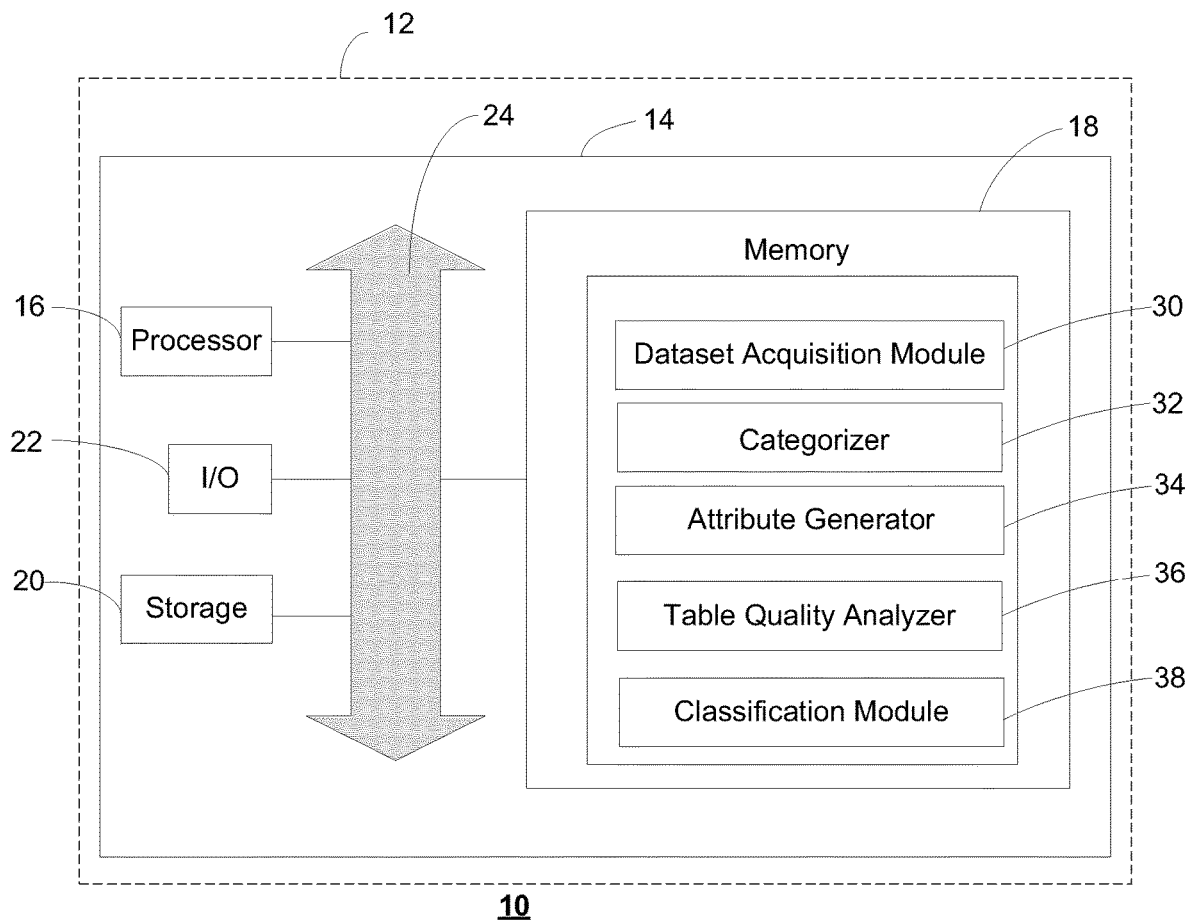

10
Figure 1

Algorithm: Table classification (X)
Input : a set X of table cells.
Output a set A of attribute value pairs.
Set    : $A = \emptyset$

For each layout template $c$:
        1) Generate a set $A^c$ of attribute value pairs defined by applying template $c$ to X
        2) Compute $W_{content}$ and $W_{template}$ of $A^c$
        3) If $W_{content} < \varphi$
            Continue.
        4) Assign $A^c$ to A if $W_{template}$ is the max score seen thus far.
    Return A

Figure 2a

VECTOR SPACE MODEL FOR FORM DATA EXTRACTION

FIELD

Aspects of the disclosure relate to relational information, more particularly it relates to a method and system for unsupervised extraction of data.

BACKGROUND

Tables provide a natural way to present relational information to human readers. Given the enormous amount of tabular data available on the Web, if these tables could be understood by a machine, their underlying relational data could fuel many downstream applications, including ontology population [1], tabular search [2], and question answering [3], [4]. Table classification aims to extract the knowledge encoded in table representations from sources such as HTML pages, spreadsheets or plain text [6][7].

Generally, table classification is often broken into subtasks, including genuine table detection, table layout classification and header detection. Genuine table detection is concerned with separating data-bearing relational tables from the vastly predominant case of tables used only to visually organize page elements (links, images, etc.) Approaches to this task range from simple heuristics [8], [9] to more complex classifiers [10], [11], [12]. The heuristics used to pre-filter non-genuine tables are those used by the Web Table Corpora Project [14], in which tables that are not innermost tables are filtered, along with tables that contain less than 2 columns or 2 rows. Another approach assigns tables to pre-defined layout templates. For example, Crestan and Pantel [5] propose grouping tables into seven main categories, including vertical listing, horizontal listings and matrices. Lautert et al. [15] modify and extend the taxonomy disclosed by Crestan and Pantel [5] to account for more complex table architectures.

Yet another approach combines features inspired by the two previous approaches with feature selection in order to do both genuine table detection and table layout classification, Eberius et al. [12]. These supervised systems use more than one hundred features, including HTML, structural and content features. The classifiers vary from approach to approach, with boosted decisions trees, random forests and neural networks. These systems are typically trained on roughly two thousand labeled tables, all of which pass the initial non-genuine filters, and require human intervention.

It is an objective of the present disclosure to mitigate or obviate at least one of the above-mentioned disadvantages.

SUMMARY

In one aspect of the disclosure, there is provided a computer-implemented method for detecting attribute value pairs from corpus data using a computer comprising a processor and a computer readable medium comprising instructions executable by the processor to at least:
receive the corpus data comprising at least one pair;
detect a layout template of the at least one pair;
measure the merit of the layout template by determining at least one of: (a) relative magnitudes of content probabilities based on a probability of the contents of an attribute cell and a probability of a corresponding value cell, (b) validity of a name-value pair, or (c) the pointwise mutual information of a frequency matrix M corresponding to a sparse vector capturing context information of a word; and output detected attribute value pairs.

In another aspect, there is provided a computer-implemented method for extracting data from data-bearing tables, using a computer comprising a processor and a computer readable medium comprising instructions executable by the processor to at least:
acquire at least one data-bearing table comprising a plurality of rows and a plurality of columns of data values;
assign at least one table layout template for the at least one data-bearing table;
generate a set of attribute value pairs, $A^c$, for the at least one table layout template;
compute a content score, $W_{content}$ defining a percentage of likely attribute-value pairs for the at least one table layout template;
compute a template score, $W_{template}$ based on attribute-value pairs and word frequencies for the at least one table layout template;
determine whether content score, $W_{content}$ is greater than a threshold associated with a percentage of likely attribute value pairs; and when content score, $W_{content}$ is greater than the threshold, identify a most suitable at least one table layout template for the at least one data-bearing table based on the template score, $W_{template}$ and output a set of attribute value pairs.

In another aspect, there is provided a non-transitory computer-readable medium storing computer readable instructions that, when executed by one or more computing devices, cause at least one of the computing devices to:
acquire at least one data-bearing table comprising a plurality of rows and a plurality of columns of data values;
assign at least one table layout template for the at least one data-bearing table;
generate a set of attribute value pairs, $A^c$, for the at least one table layout template;
compute a content score, $W_{content}$ defining a percentage of likely attribute-value pairs for the at least one table layout template;
compute a template score, $W_{template}$ on attribute-value pairs and word frequencies for the at least one table layout template;
determine whether content score, $W_{content}$ is greater than a threshold associated with a percentage of likely attribute value pairs;
when content score, $W_{content}$ is greater than the threshold, identify a most suitable at least one table layout template for the at least one data-bearing table based on the template score, $W_{template}$ and output a set of attribute value pairs.

In another aspect, there is provided an apparatus for extracting data from data-bearing tables, the apparatus comprising:
at least one processor;
a computer readable medium comprising instructions executable by the at least one processor to cause the processor to at least:
acquire at least one data-bearing table comprising a plurality of rows and a plurality of columns of data values;
assign at least one table layout template for the at least one data-bearing table;
generate a set of attribute value pairs, $A^c$, for the at least one table layout template;

compute a content score, $W_{content}$ defining a percentage of likely attribute-value pairs for the at least one table layout template;

compute a template score, $W_{template}$ based on attribute-value pairs and word frequencies for the at least one table layout template;

determine whether content score, $W_{content}$ is greater than a threshold associated with a percentage of likely attribute value pairs;

when content score, $W_{content}$ is greater than the threshold, identify a most suitable at least one table layout template for the at least one data-bearing table based on the template score, $W_{template}$ and output a set of attribute value pairs.

In another aspect, there is provided an apparatus for extracting data from data-bearing tables, the apparatus comprising at least one processor, a computer readable medium comprising instructions executable by the at least one processor to cause the processor, the apparatus comprising:

a dataset acquisition module for acquiring at least one data-bearing table from a data source, the at least one data-bearing table comprising a plurality of rows and a plurality of columns of data values;

a categorizer for assigning at least one table layout template for the at least one data-bearing table;

an attribute generator for generating a set of attribute value pairs, $A^c$, for the at least one table layout template;

a table quality analyzer for computing a content score, $W_{content}$ defining a percentage of likely attribute-value pairs for the at least one table layout template; for computing a template score, $W_{template}$ based on attribute-value pairs and word frequencies for the at least one table layout template;

a classification module for identifying a most suitable at least one table layout template for the at least one data-bearing table based on the template score, $W_{template}$ and a relationship between the content score, $W_{content}$ and a threshold associated with a percentage of likely attribute value pairs, and output a set of attribute value pairs.

Advantageously, the vector space model encodes the word frequency information and leverages the name-value pairs have semantic relations, which can be learned from a large amount of unlabelled text and can be represented by vector space models in natural language processing. For example, names will generally consist of high-frequency words, while values will tend to be lower-frequency, where frequency is the prior probability in the vector space model. Moreover, name value pairs typically co-occur in natural language and a set of values often share context words. As a result, by exploring the semantic similarity and relatedness between names and values, one can categorize a given form into a predefined category without human labelled data, and then accurately identify the name-value pairs. The word frequency features not only improve the state-of-the-art supervised approach, but also provide competitive performance as a stand-alone unsupervised method that scales well to massive datasets.

In contrast to the prior art approaches, the disclosed method and system does not require labeled training tables, and uses only one highly-informative feature: cell content frequencies, as determined by a large background corpus. In addition, the disclosed approach may be applied to supervised classification.

BRIEF DESCRIPTION OF THE DRAWINGS

Several exemplary embodiments of the present disclosure will now be described, by way of example only, with reference to the appended drawings in which:

FIG. 1 shows an illustrative environment for an unsupervised method for table classification, in one exemplary embodiment;

FIG. 2a shows an unsupervised table classification method;

DETAILED DESCRIPTION OF EXEMPLARY EMBODIMENTS

Figure 2B:
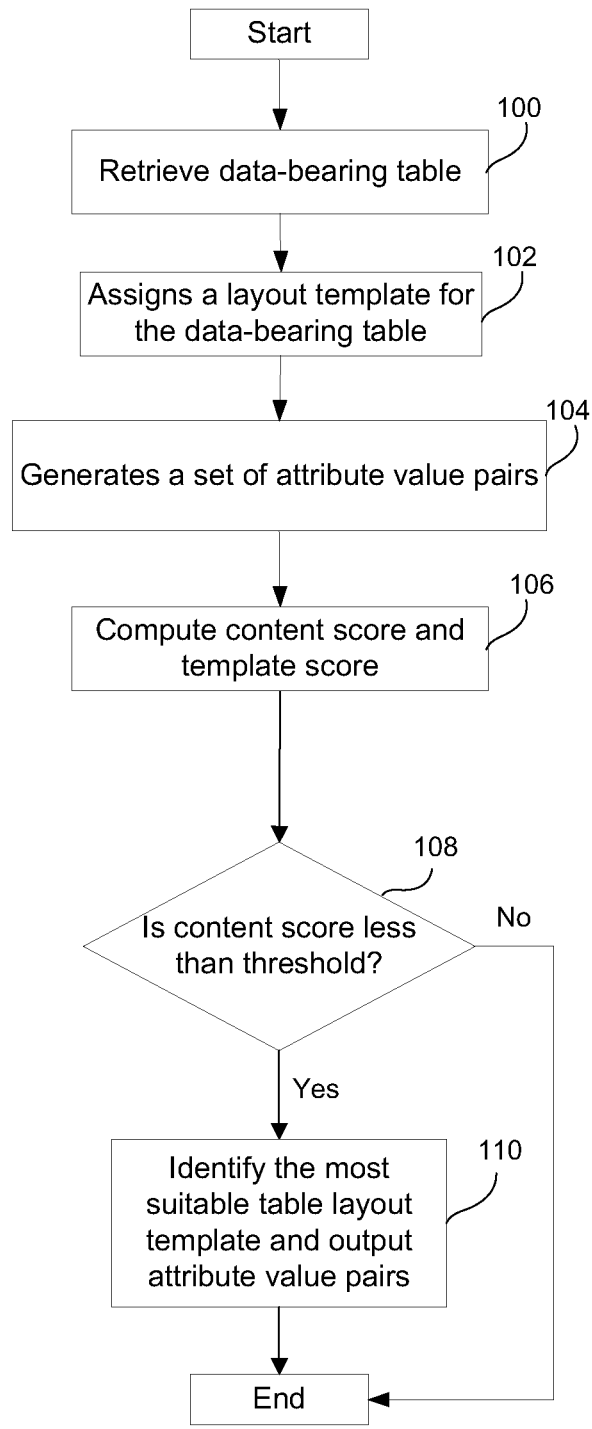
FIG. 2b shows a flowchart with exemplary steps for an unsupervised method for table classification.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Turning to the drawings, FIG. 1 shows illustrative environment 10 for an unsupervised method detection of attribute value pairs, in one exemplary embodiment. Generally, environment 10 includes computer system 12 that can perform a process described herein in order to extract data from a table. In particular, computer system 12 is shown including computing device 14 that includes the unsupervised table classification program, which makes computing device 14 operable to extract data from a table by performing a process described herein.

Computing device 14 is shown including processing component 16 (e.g., one or more processors), memory 18, storage system 20 (e.g., a storage hierarchy), input/output (I/O) component 22 (e.g., one or more I/O interfaces and/or devices), and centralized circuit system 24. In general, processing component 16 executes program code, such as the unsupervised table classification program, which is at least partially fixed in memory 18. To this extent, processing component 16 may comprise a single processing unit, or be distributed across one or more processing units in one or more locations.

Memory 18 also can include local memory, employed during actual execution of the program code, bulk storage (storage 20), and/or cache memories (not shown) which provide temporary storage of at least some program code in order to reduce the number of times code must be retrieved from bulk storage 20 during execution. As such, memory 18 may comprise any known type of temporary or permanent data storage media, including magnetic media, optical media, random access memory (RAM), read-only memory (ROM), a data cache, a data object, etc. Moreover, similar to processing component 16, memory 18 may reside at a single physical location, comprising one or more types of data storage, or be distributed across a plurality of physical systems in various forms.

While executing program code, processing component 16 can process data, which can result in reading and/or writing transformed data from/to memory 18 and/or I/O component 22 for further processing. Centralized circuit system 24 provides a direct or indirect communications link between each of the components in computer system 12. I/O component 22 can comprise one or more human I/O devices, which enable a human user to interact with computer system 12 and/or one or more communications devices to enable a system user to communicate with computer system 12 using any type of communications link.

The unsupervised table classification program can manage a set of interfaces (e.g., graphical user interface(s), application program interface, and/or the like) that enable human and/or system users to interact with the unsupervised table classification program. The users could include system administrators and/or clients who need to query and/or provide query and/or other access to a tabular dataset, among others. Further, the unsupervised table classification program can manage (e.g., store, retrieve, create, manipulate, organize, present, etc.) the data in storage system 20, including, but not limited to a tabular dataset and/or analysis tools, using any solution.

In any event, computer system 12 can comprise one or more computing devices 14 (e.g., general purpose computing articles of manufacture) capable of executing program code, such as the unsupervised table classification program, installed thereon. As used herein, it is understood that "program code" means any collection of instructions, in any language, code or notation, that cause a computing device having an information processing capability to perform a particular action. To this extent, the unsupervised table classification program can be embodied as any combination of system software and/or application software.

Further, the unsupervised table classification program can be implemented using a set of modules 30-38. In this case, modules 30-38 can enable computer system 12 to perform a set of tasks used by the unsupervised table classification program, and can be separately developed and/or implemented apart from other portions of the unsupervised table classification program. As used herein, the term "component" means any configuration of hardware, with or without software, which implements the functionality described in conjunction therewith using any solution, while the term "module" means program code that enables computer system 12 to implement the actions described in conjunction therewith using any solution. When fixed in memory 18 of computer system 12 that includes processing component 16, a module is a substantial portion of a component that implements the actions. Regardless, it is understood that two or more components, modules, and/or systems may share some or all of their respective hardware and/or software. Further, it is understood that some of the functionality discussed herein may not be implemented or additional functionality may be included as part of computer system 12. As discussed herein, the unsupervised table classification program enables computer system 12 to extract table data. To this extent, the unsupervised table classification program is shown including dataset acquisition module 30, categorizer 32, table attribute generator 34, quality analyzer 36, and classification module 38.

When computer system 12 comprises multiple computing devices 14, each computing device 14 can have only a portion of the unsupervised table classification program fixed thereon (e.g., one or more modules 30-38). However, it is understood that computer system 12 and the unsupervised table classification program are only representative of various possible equivalent computer systems that may perform a process described herein. To this extent, in other embodiments, the functionality provided by computer system 12 and the unsupervised table classification program can be at least partially implemented by one or more computing devices that include any combination of general and/or specific purpose hardware with or without program code. In each embodiment, the hardware and program code, if included, can be created using standard engineering and programming techniques, respectively.

In one example, the core task of table classification to be the extraction of attribute-value pairs. For example, the question "What language do people in France speak?" can be answered by Table I or II, but to extract the answer from either, it is imperative to know how the cells of Table I or Table II are grouped into entities, and which cells provide the names for the entities' attributes. Table I is representative of relation tables with rows corresponding to entities and columns corresponding to attributes of those entities. The attribute names appear in the first row, called the header, often used to display multiple records. Table II is representative of entity tables, which provide details for a single entity, with its attribute names in the first column, and attribute values in the second column.

TABLE I

RELATION TABLE

| Country | Language |
|---------|----------|
| France  | French   |
| . . .   | . . .    |

TABLE II

ENTITY TABLE

| Country  | France |
|----------|--------|
| Language | French |
| . . .    | . . .  |

Once a table's layout has been determined, entities represented as sets of attribute-value pairs are extracted. The data extracted from Tables I and II can then share the same representation:

{Country=France, Language=French}     (1)

which in turn can be stored in a relational database, or transformed into Resource Description Framework (RDF) triples, depending on the needs of the downstream application.

The notion of an attribute-value representation of an entity represents an immediately-useful outcome of table understanding, and leverages the following insight: if table layout is useful for finding attribute-value pairs, then finding likely attribute pairs can help determine table layout. Therefore, it is not necessary to find all pairs, but only enough pairs to determine a likely layout. For example, if it is known that France is a Country, that knowledge is helpful in knowing the orientations of Tables I and II. This intuition, coupled with a simple statistical characterization of likely attribute-value pairs based on word frequencies allows for the development of an unsupervised table extraction method. This method can achieve reasonable table detection and classification performance on its own, or it can be used in a supervised classifier to establish a new state-of-the-art.

To illustrate the unsupervised table classification program in more detail, the method comprises a vector space model which encodes the word frequency information. The method leverages one key observation, that is, the name-value pairs have semantic relations, which can be learned from a large amount of unlabelled text and can be represented by vector space models in natural language processing. For example, names will generally consist of high-frequency words, while values will tend to be lower-frequency, where frequency is the prior probability in the vector space model. Moreover, name value pairs typically co-occur in natural language and a set of values often share context words. As a result, by exploring the semantic similarity and relatedness between names and values, one can categorize a given form into a predefined category without human labelled data, and then accurately identify the name-value pairs.

A traditional frequency matrix as word representation [19] is adopted, in which each word in a frequency matrix M typically corresponds to a sparse vector capturing its context information by co-occurred frequency. In particular, each entry in M is the number of times word w appears in its context c in the given text corpus, and can be converted to a joint probability P (w, c) [20]. In general, the matrix only keeps positive pointwise mutual information (PPMI) [21], defined as:

$$PPMI(w_i, w_j) = \begin{cases} PMI(w_i, w_j) & \text{if } PMI(w_i, w_j) > 0 \\ 0 & \text{otherwise} \end{cases} \quad (2)$$

where $PMI(w_i, w_j)$ is as follows: (3)

$$PMI(w_i, w_j) = \log \frac{P(w_i, w_j)}{P(w_i)P(w_j)}$$

Next, with respect to word frequency for table classification, a labeled table is denoted as (X, c), where X is a matrix of cells, and c is the associated table layout class. In one example, c ranges over Relation and Entity, though in principle, the method can assess any layout that deterministically groups cells into attribute names-value pairs. Each table cell x in X contains one or more words x={$w_1$, $w_2$, ..., $w_j$}, and the set of unique words w is called the vocabulary V. From a table classification perspective, a matrix X with layout c implies a set of $m_c$ attribute-value pairs $A^c$={$a_1^c, a_2^c, \ldots, a_{m_c}^c$} where each $a_k^c$ consists of two table cells, namely the attribute cell $x_{att}$ and value cell $x_{val}$, and the pattern that pairs attributes with values is determined by c. Accordingly, candidate layouts c may be compared by comparing their corresponding attribute-value pairs $A^c$.

Generally, table classification goal is to correctly extract entities, represented as sets of attribute-value pairs. Accordingly, one goal is to identify tables that contain high quality attribute-value pairs, and another goal is to detect the correct layout templates of these pairs. To attain these two goals simultaneously, the following score metric to measure the merit of a layout template c is deployed:

$$W(c \mid X) = \frac{1}{m_c} \sum_{k=1}^{m_c} S(a_k^c) \quad (4)$$

where $m_c$ is the number of attribute-value pair candidates given $_c$, and S ($a_k^c$) is a score assigned to the two table cells being paired, namely $x_{att}$ and $x_{val}$. To score each pair, the following intuition is relied upon: attribute names will tend to be more universal, and therefore, more common, than attribute values. For example, people will tend to discuss countries in general more often than they will discuss France in particular. From an information-theoretic standpoint, one can expect attribute values to be more informative, and therefore less likely than their attribute names. This leads to the following scoring function S ( ), which accounts for the relative magnitudes of the content probabilities:

$$S(n) = \log \frac{P(x_{att})}{P(x_{val})} \quad (5)$$

where P ($x_{att}$) is the probability of the contents of the attribute cell and P ($x_{val}$) is the probability of the corresponding value cell. Alternatively, one can account for the same intuition using a step function of the two probabilities:

$$S(n) = \begin{cases} 1 & \text{if } P(x_{att}) > P(x_{val}) \\ 0 & \text{otherwise} \end{cases} \quad (6)$$

which ignores magnitudes; instead, when used in Equation 4, this step function simply counts the percentage of cells for which the above-noted intuition holds. The other optional name value classification method is the following:

$$S(a) = \begin{cases} 1 & \text{if } PMI(x_{att} \ldots x_{val}) > 0 \\ 0 & \text{otherwise} \end{cases} \quad (7)$$

P ($x_{att}, x_{val}$) is computed using Equation 3. Note that all probability information can be obtained from the vector space model [19], represented as a frequency matrix.

Equations 5, 6 and 7 provide three different metrics to measure the quality of a candidate layout, and these metrics are used in Equation 4 to calculate the content score $W_{content}$, which is bounded between 0 and 1, and characterizes the percentage of likely attribute-value pairs under a given layout. Generally, if all layouts have low content scores, that is a strong signal that none of the considered layouts apply, and therefore no data should be extracted from this table, and so the table can be classified as non-genuine.

Typically, computing table cell probability P(x) requires one to know the joint probability of p($w_1, w_2, \ldots, w_j$), where $w_1 \ldots w_j$ is the sequence of words in the table cell x. Practically, it is infeasible to explicitly represent the joint probability due to the exponential number of parameters. Therefore, a word independence assumption is applied, which works reasonably well as will be shown in the experiments, as will be described later:

$$P(x) = P(w_1, w_2, \ldots, w_j) = \prod_j P(w_j) \quad (8)$$

Equation 8 assumes that each word's probability is independent from the words that precede it, identical to the independence assumption made in unigram language modeling [22]. The probability of $\hat{P}(w_j)$ is estimated as follows:

$$\hat{P}(w_j) = \frac{w_j}{docCount} \quad (9)$$

where $n_j$ is the number of training documents in which $w_j$ appears, and docCount is the total number of documents in the corpus.

Generally, if a cell only contains single word, since only probability ratios (Equation 5) and probability comparisons (Equation 6) are considered, then there should be no need to calculate normalized probabilities, and can therefore operate on raw frequencies. However, for cells with multiple words, the docCount term does matter, and may begin to dominate as many word probabilities are multiplied. To avoid infinitesimally small cell probabilities, $P(x)$ is rounded to $$\frac{1}{docCount}$$

if it smaller than $$\frac{1}{docCount},$$

capping the information content of all cells at the information content of the rarest word in the corpus. Similarly, cells containing previously unknown words or numbers are also given a probability of $$\frac{1}{docCount}.$$

Referring once again to the example in Table I to better illustrate the novel and inventive method, two table layouts, relation and entity, are considered, and it is assumed that the first row and column respectively are attribute names. The general principle can apply to other layouts in a similar way. The word frequencies, shown in Table III, are derived from the Google n-gram corpus, version 1.1.

TABLE III

WORD FREQUENCY FROM GOOGLE N-GRAM

| Word | Frequency |
|---|---|
| Country | 188.696.181 |
| Language | 138.523.112 |
| France | 102.700.610 |
| French | 81.398.445 |

Assuming a relation layout, with attribute names in the first row, the following pairs are extracted from Table I:

Country=France, Language=French    (10)

However, assuming an entity template with the attribute in the first column, the following pairs may be extracted:

Country=Language, France=French    (11)

Generally, the task of table classification is to extract correct pairs in Table I. Accordingly, their $W_{template}$ is computed based on their corresponding attribute value pair and word frequencies as follows.

$$W(\text{relation}|X)_{template} = \frac{1}{2}\left(\log\frac{P(\text{Country})}{P(\text{France})} + \log\frac{P(\text{Language})}{P(\text{French})}\right) \quad (12)$$
$$= \frac{1}{2}\left(\log\frac{188696181}{102700610} + \log\frac{138523112}{81398445}\right)$$
$$= 0.82$$

where $W(\text{relation}|X)_{template}$ is the template score given the relation template. The 1 is the size of extracted pairs, and the normalization term is canceled out. Similarly, $\hat{W}(\text{entity}|X)_{template}=0.39$ may be obtained. Thus, the pairs implied by the relation layout in 10 have the highest $W_{template}$ score according to the novel and inventive word frequency approach disclosed herein.

From this example, it can be seen that the word Country can be the attribute of France, but the reverse is not true based on their frequencies and Equation 6, since the domain of Country may contain many domain values, and people tend to mention the domain name Country regardless the conversation is about France or Canada. Consequently, a relatively higher occurrence of the word Country can be observed in natural language.

With the above two metrics, the table layout classification algorithm, as shown FIG. 2a, will now be described with reference to FIG. 2b. Looking at FIG. 2b, there is shown a flowchart with exemplary steps for an unsupervised method for table classification, in an exemplary embodiment. In step 100, computer system 12, executing dataset acquisition module 30 retrieves a data-bearing table from a data source 20, where data-bearing table comprises a plurality of rows and a plurality of columns of data values. In any case, as shown, tabular dataset includes a set of data elements which can include data, such as data element or can have no data. Data elements can be addressed by a set of row indicators and/or a set of column indicators, using any solution. Retrieval of tabular dataset can be performed using any solution now known or later developed, including, but not limited from retrieval from a storage system 20, over a local area or wide area network, or the like, or creation by the user. In any case, tabular dataset, as retrieved by dataset acquisition module 30 can be an uncatalogued set of data. Specifically, tabular dataset does not require the inclusion and/or association of interlinking data, indices, metadata or other external links into the data, interfaces, or other access tools in order to be utilized by the unsupervised table classification program.

Next, in step 102, once tabular dataset has been retrieved, categorizer 32, as executed by computer system 12, assigns a layout template for the data-bearing table. For example, the data-bearing genuine tables may be assigned a template according to one of three categories:

1) Relation, in which attribute names are found in the first row, and each row describes an entity, and there may be multiple rows;
2) Entity, in which attribute names are found in the first column; and each column describes an entity, and there may be multiple columns; and
3) Other, for any other tables that do not match one of these two templates are considered as other, including layout, matrix and mixed formats. In practice, the majority of tables classified as other are non-genuine tables used only for page layout purposes. In step 104, as executed by computer system 12, attribute generator 34 generates a set of attribute value pairs, $A^c$, for each layout template.

Next in step 106, as executed by computer system 12, table quality analyzer 36 computes a content score, $W_{content}$ defining a percentage of likely attribute-value pairs for each table layout template, and computes a computing a template score, $W_{template}$ based on attribute-value pairs and word frequencies for each layout template.

In step 108, as executed by computer system 12, classification module 38 determines whether content score, $W_{content}$ is greater than a threshold associated with a percentage of likely attribute value pairs; and in step 110 when content score, $W_{content}$ is greater than the threshold, identify the most suitable table layout template for the data-bearing table based on the template score, $W_{template}$, by outputting a set A of attribute value pairs.

Accordingly, steps 106 and 108 effectively filter out low-quality tables by detecting situations where even the highest-scoring template has a small percentage of likely attribute-value pairs, thereby detecting any non-genuine tables that were missed by the coarse heuristic filters, as described above. Whereas in prior art methods, table classification is often broken into sub-tasks, including genuine table detection, table layout classification and header detection. However, such methods rely on supervised systems and training data, which limit the set of tables to the known headers. Methods described herein are table agnostic, and do not rely on headers.

Experimental Design

In one exemplary experimental design, default content percentage threshold of $\varphi=0.5$ is used for the unsupervised algorithm. To define the table classification task, the terminology of the Web Table Corpora Project [14], which classifies tables into entity and relation layouts, was adopted. One objective was to simultaneously detect data-bearing genuine tables and determine whether their layout conforms to the templates of interest by assigning each table to one of three categories, relation, entity and other, as described above. It should be noted that this marks a departure from previous research, which has focused on either orientation (horizontal and vertical) [5] or on related but distinct notions of table type (relation, entity and matrix) [14]. Previous studies on orientation have also included tables where the attribute names (i.e.: the header) are missing—where tables with missing headers were considered to be a distinct case, currently grouped within other. The choice in classification stems from the focus on extracting attribute-value pairs: if a table matches either of these two templates, then it is easy to extract named attributes for entities. Furthermore, these two cases cover the majority of genuine tables found on the web [11][2]. In all experiments, table classification performance is measured with precision, recall and balanced F-measure (F1) over the two data-bearing templates: entity and relation.

In one example, the web table dataset used in the experiments was sampled from the Common Crawl, which is publicly available on Amazon Elastic Cloud, s3://common-crawl/crawl-data/CC-MAIN-2015-35/. This Common Crawl contains more than 1.84 billion webpages. All tables found within HTML <TABLE> tags were extracted, filtering out tables with less than 2 rows or 2 columns and non-English tables as determined by language-detector, https://github.com/optimaize/language-detector. Any duplicate tables were also filtered, and retained only one table per host.

From this pool of filtered tables, 3,000 tables were randomly sampled for annotation using the Crowdflower crowdsourcing platform, https://www.crowdflower.com. Additionally, 268 tables were labeled internally to provide as hidden, gold-standard annotations, used to judge the crowd-sourced annotators. Annotators labeled ten tables at a time, nine data tables and one gold-standard table, and were tasked to classify each table into 4 classes: Relation (called "header-row" in the instructions), Entity (called "header-column"), Not English and Other. These last two categories were later merged into a single Other to create the three-way classification task described above. If an annotator was able to retain >70% accuracy on the gold-standard questions, then the annotators were considered trusted, otherwise, all their annotations were excluded. At least 5 judgments were collected from trusted annotators for each of the 3,000 tables.

In general, the task seemed well-suited to crowd-sourced annotation. The trusted annotators agreed amongst themselves with a rate of 82%, and they achieved on average 86% agreement with the gold standard. Any table where fewer than ⅘ annotators agreed on the table's category. The final result is a corpus of 2,541 English tables with high quality labels.

The class distribution of the labeled corpus is summarized in Table IV. 71% of the tables are classified as Other, which is close to non-genuine tables found in other data sets [5].

TABLE IV

DISTRIBUTION OF TEMPLATES IN OUR DATA SET.

| Class | Percentage |
|---|---|
| Relation | 17 |
| Entity | 12 |
| Other | 71 |

Supervised Baseline: Many of the experiments were deigned to compare to or enhance a supervised baseline reflecting the current state-of-the-art for table classification. This was implemented as a random-forest classifier using features from [10], [13], [5], [12].

In the experiments, the random forest classifier was implemented by WEKA [23], and the features are generated by the publicly available table classification software, https://github.com/JulianEberius/dwtc-tools, version 1.1.0, used by the Web Table Corpora [14]. The features used by this system are categorized into three categories: HTML, layout and stylistic features.

Layout features capture the structure information of a table:
  Max numbers of cells for row and column.
  The average number of cells per rows and column.
  Standard deviations of the number of cells per row and column.
HTML features include global and local ratios, where global ratios are computed over the full table region, and local ratios focus on the potential header and value regions, including the first two row, the first two columns, and the last row and column.
  The global ratios of cells with each of the following tags: <img>, <a> and <form>.
  The local ratios of cells with the following tags: <th>, <img>, <a>, <input> and <select>.
Stylistic features represent the writing style of a table: The percentage of cells that are dominated by alphabetic or numeric characters.
  The percentage of empty cells.
  Max and average length in characters of cell contents.
  The percentage of cells with colons.
  The percentage of cells with commas.
  The percentage of cells with brackets.
  The percentage of cells with numeric characters.

When reporting results for supervised systems, a 10-fold cross validation was performed over 10 different random partitions of the data, and report results averaged over all 100 trials. Therefore, the supervised systems are trained on roughly 2,286 labeled tables, well in line with previous work.

Experiments

In the experiments, the word frequency approach to table classification id first assessed as the centerpiece of an unsupervised method carrying out a joint genuine-table detection and table-layout classification task. The impact of the word frequency features on a state-of-the-art supervised system is evaluated.

A. Unsupervised Learning

The predictive performance of the unsupervised learning method is assessed. Next, the method's sensitivity was tested to the quantity of background data and to the domain from which the data was collected.

1) Predictive Performance: Predictive Results obtained by the unsupervised method and the state-of-the-art approach are presented in Table V. The word frequencies that power the unsupervised approach are derived from the unigram frequencies in the Google Web n-gram corpus.

TABLE V

CLASS SPECIFIC PRECISION, RECALL, AND F1 OBTAINED FOR VARIOUS METHODS: THE BEST SCORES ARE HIGHLIGHTED IN BOLD.

| Table Type | Word Frequency | | | SOTA Supervised | | |
|---|---|---|---|---|---|---|
| | Precision | Recall | F1 | Precision | Recall | F1 |
| Relation | 73.5 | 88.2 | 80.2 | 88.1 | 80.5 | 84.1 |
| Entity | 71.2 | 84.2 | 78.1 | 88.9 | 80.3 | 84.4 |

The unsupervised method achieves relatively high recall, meaning that that if a practitioner were interested in high-recall table classification, it may be possible to operate without any labeled tables at all. For example, [11] suggested that for many applications, such as web search or schema design, one may prefer high recall and operate safely at relatively low levels of precision. Table V also suggests that the unsupervised method obtains competitive predictive performance when compared with the state-of-the-art supervised approach.

Generally, an unsupervised approach may often be more suitable for table classification, due to its dynamic nature. In addition, since attribute-value pairs are the final result, the user can always define their own templates, which could potentially be much more complex than those tested in the experiment. Advantageously, since no labeled data is required, the method does not need to be retrained and data does not need to be relabeled to handle new table layouts.

2) Background Corpus Quantity: To evaluate the method's sensitivity to the quantity of background data used to derive its word frequency counts, an experiment with the scenario where the word frequencies are derived from in-domain data was conducted. This was achieved by counting word frequencies within the cells of the 2015 Web Table Corpora [14], which contains 250 million tables and 24 billion tokens. For each word in the vocabulary, the number of distinct tables the word appears in was enumerated, analogous to document frequency in information retrieval. These frequencies were used as is, except all fully numeric tokens had their frequencies overridden as 1, so all numbers are credited with the maximum amount of information. Then a learning curve was built, testing between 0.0001% and 100% of the 250 million tables, measuring relation and entity F1 over the entire data set at each point in the curve.

Figure 3:
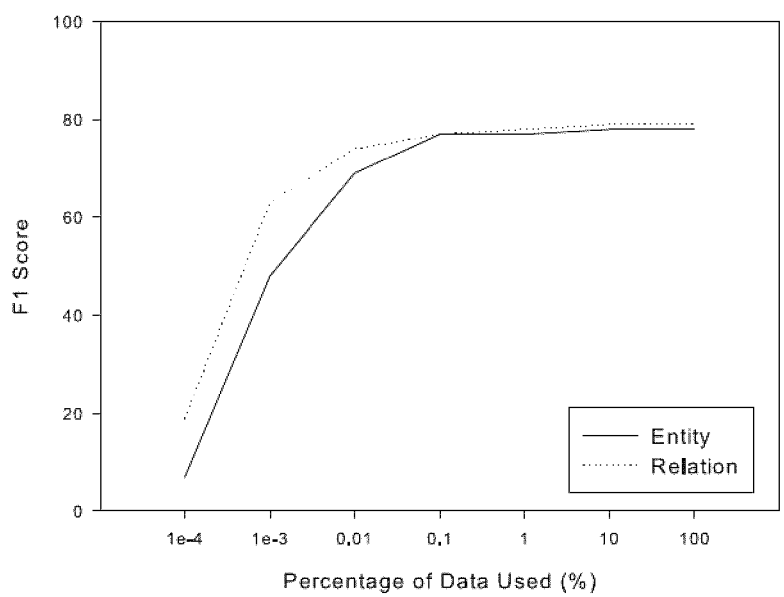
FIG. 3 shows learning curves obtained by an unsupervised method, while varying the percentage of unlabeled corpus data used.

The results are shown in FIG. 3. As one can see, both metrics achieve near-peak performance after seeing only 0.1% of the corpus data (250 thousand tables). Both table templates have stable performance after leveling off, with no indication of overfitting as data sizes increase.

3) Background Corpus Domain: To test the method's sensitivity to the domain from which the data was collected, an experiment with the scenario where the word frequency model is built from a very large, out-of-domain corpus, is conducted. This was achieved using unigram frequencies from the Google Web n-gram corpus, version 1.1, LDC2006T13, which was constructed from approximately 1 trillion tokens of text from Web pages collected in January 2006. The Google token frequencies provide only an approximation to the document frequencies expected by the method; docCount was approximated using the maximum frequency in the n-gram corpus (2.3135851162E10) Again, numeric tokens had their frequencies overridden as 1. The word frequency model built with Google n-grams was then compared to one built from the complete Web Table Corpora in Table VI.

Despite the domain mismatch, the Google n-gram frequencies performed similarly with Web Table frequencies for both templates. These results demonstrated that there is little disadvantage to using an out-of-domain background corpus with the present method, provided that corpus is sufficiently large. Such results are indicative of the fact that the present model is unlikely to require re-training both over time and across domains. Accordingly, the remainder of the experiments used the Google n-grams for the background corpus, as their counts are easily accessible to all.

Figure 4:
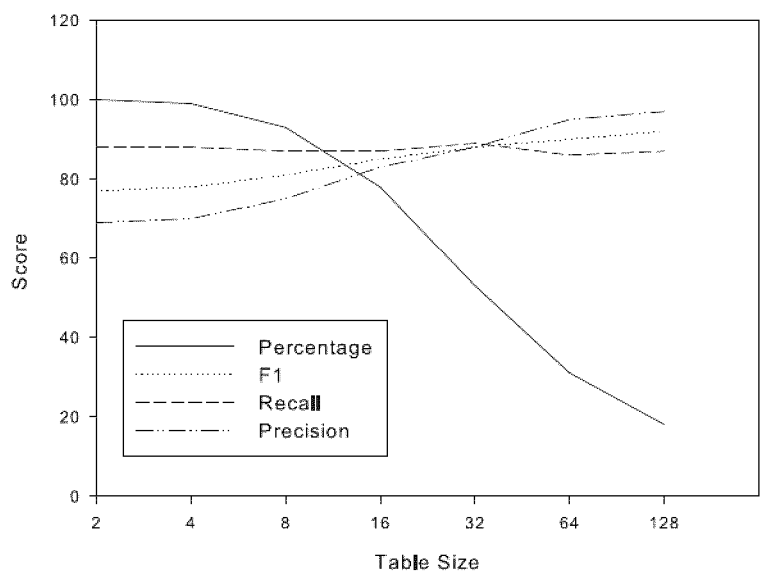
FIG. 4 shows the impact of table size on the performance of the word frequency method.

4) Impact of Table Size: The relation template was used to study the impact of table size on classification performance. Table size is measured by the number of non-empty table cells, which are defined as cells containing letters or digits. Thus, even a table with many cells may be considered small if it contains too many empty cells. FIG. 4 shows that the performance of the word frequency method gradually improves with larger tables. The percentage of relation tables that have x lines or fewer is indicated by the solid line labeled percentage. It starts at 100% and gradually decrease to around 20% given 128 cells.

The major improvement comes from the precision, where it improves from 69% to 92% given 128 cells. Recall is stable over different table sizes. The constant recall performance indicates that the word frequency method is essentially a necessary condition: a genuine table is always expected to pass the frequency test regardless of its size. As a large table effectively reduces the noise in the word-frequency signal; precision improves with table size while still maintaining recall.

5) Computational Cost: As the web contains a wealth of structured relational data, processing billions of tables often requires non-trivial engineering efforts. The algorithm calculates a probability ratio once for each table cell for each candidate template. In one example, there were only two candidate templates (entity and relation), and therefore the number of templates was expected to be fixed in any realistic deployment of this approach. Thus, the time complexity of the present unsupervised algorithm is O(l), where l is the number of cells in the table.

If the an easily parsed data matrix is assumed as input (as opposed to HTML-formatted tables), the extraction speed of the present unsupervised implementation was at least 10 thousand tables per second. In fact, the present method was able to extract relation data from the 250 million tables found in the Web Table Corpora in just 7 CPU hours, demonstrating its suitability for large-scale table extraction. Furthermore, the present method operated on each page independently, making it suitable for parallelization.

B. Supervised Learning

The impact of the word frequency feature on a state-of-the-art supervised system. The word frequency approach used a signal that is quite distinct from previous supervised features, therefore the question is whether combining the word frequency feature with supervised learning would achieve better performance.

The following summarizes the algorithms that were used in the comparisons:
1) Supervised: The supervised baseline system, as described above.
2) Supervised and Frequency: Content scores $W_{content}$ were added to the supervised system's feature set, as described above.

Table VII shows the results of this experiment. As one can see, though the fully unsupervised use of word frequency lags behind the supervised approaches, features generated from word frequency significantly boost the performance of the supervised method across all metrics and templates, as determined by a paired t-test with significance level 0.05.

TABLE VII

PRECISION, RECALL, AND F1 OBTAINED BY FEATURES AGAINST VARIED TABLE TYPES: THE BEST SCORES ARE HIGHLIGHTED IN BOLD.

| Table Type | SOTA Supervised | | | Supervised + Frequency | | |
|---|---|---|---|---|---|---|
| | Precision | Recall | F1 | Precision | Recall | F1 |
| Relation | 88.1 | 80.5 | 84.1 | 93.5 | 85.3 | 89.1 |
| Entity | 88.9 | 80.3 | 84.4 | 91.1 | 85.3 | 88.1 |

One important question in a supervised learning setting is how much labeled data is required to reach high performance. To simplify the discussion, a learning curve study is presented using the relation template. However, similar patterns were observed for the entity template.

Figure 5:
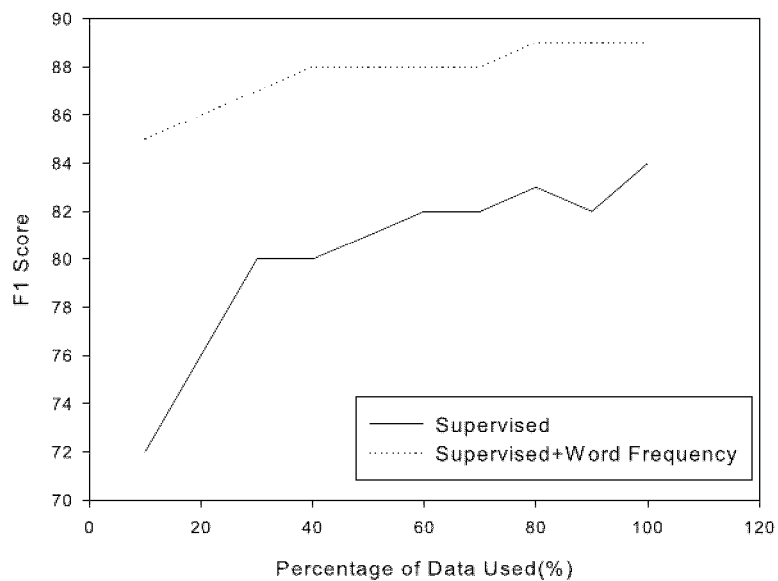
FIG. 5 shows a learning curve for the random forest classifier using the two feature sets.

FIG. 5 shows a learning curve for the random forest classifier using the two feature sets. Each point in the learning curve is the average result from 10-fold cross validation, where the testing data is always 1 fold and the training is varied by certain percentage of the remaining 9 folds (approximately 2,286 tables). The word frequency features were found to improve the supervised approach at all points on the learning curve. In fact, the word frequency features allowed a supervised classifier trained on only approximately 229 tables to outperform a version without this feature trained on approximately 2,286 tables.

The supervised approach needed roughly 30% of the data (approximately 685 tables) to achieve reasonable performance, and appears to be beginning to level off as it reaches 2,000 labeled tables. This result agrees with previous research. The state-of-the-art Web Table Corpora [14] uses 2,000 labeled instances to classify into 4 table types, and a commercial system used 5,000 instances for 10 table types [5].

In another implementation, tabular dataset can be in the form of a spreadsheet, or alternatively, can be contained in any other type of application that can represent a set of data in a tabular format, including but not limited to a word processing application, a presentation application, an illustration application or the like.

In another exemplary implementation, the word frequency method may be used to improve unlabeled background corpus. The frequency relation between an attribute-value pair is more likely to be held if the background corpus consists of attribute-value pairs. If a larger relation table is converted into many pairs, would be expected to appear more often than their values. However, this assumption may not hold in textual web data. For example, the Google Web n-grams show that the frequency of the attribute-value red is larger than its attribute-name color. This indicates that the word frequency method may be improved by finding better corpus data. One such improvement would be to use in-domain data. If frequencies specific to each website are collected, it is possible to make a more fined granularity probability estimation, or interpolate site-specific counts with a large background corpus.

In another exemplary implementation, relaxing the independence assumption between words used in Equation 8, which has been long discovered to have wrong probability estimation in machine learning community [24], may lead to an improvement. This may be accomplished by expanding the n-gram order to account for more words of context when calculating each word's probability. This would involve smoothing probability estimates to account for those cases where an n-gram has not been previously seen in the background corpus. Fortunately, this area is very well studied [22] and packages exist for fast and memory-efficient querying of very large contexts, such as 4- or 5-grams [25]. Recurrent Neural Network language models may also be employed to efficiently leverage much larger context sizes [26].

In one implementation, when computer system 12 includes multiple computing devices 14, the computing devices can communicate over any type of communications link. Further, while performing a process described herein, computer system 12 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

Looking at FIG. 1, computer system 12 may be coupled to a network, having other computing devices coupled thereto.

The described illustration is only one possible implementation of the described subject matter and is not intended to limit the disclosure to the single described implementation. Those of ordinary skill in the art will appreciate the fact that the described components can be connected, combined, and/or used in alternative ways, consistent with this disclosure.

The network facilitates communication between computer system 12 and other components, for example, components that obtain observed data for a location and transmit the observed data to computer system 12. The network can be a wireless or a wireline network. The network can also be a memory pipe, a hardware connection, or any internal or external communication paths between the components.

The computing device 12 includes a computing system configured to perform the method as described herein. In some cases, the algorithm of the method can be implemented in an executable computing code, e.g., executable codes. In some cases, computer system 12 can include mobile or personal computers that have sufficient memory size to process data.

Computer system 12 may comprise a computer that includes an input device, such as a keypad, keyboard, touch screen, microphone, speech recognition device, other devices that can accept user information, and/or an output device that conveys information associated with the operation of computer system 12, including digital data, visual and/or audio information, or a GUI.

Computer system 12 can serve as a client, network component, a server, a database, or other persistency, and/or any other component of the system 10. In some implementations, one or more components of computer system 12 may be configured to operate within a cloud-computing-based environment.

At a high level, computer system 12 is an electronic computing device operable to receive, transmit, process, store, or manage data and information associated with the system 10. According to some implementations, computer system 12 may also include, or be communicably coupled with, an application server, e-mail server, web server, caching server, streaming data server, business intelligence (BI) server, and/or other server.

Computer system 12 can receive requests over a network from a client application (e.g., executing on another computer system) and respond to the received requests by processing said requests in an appropriate software application. In addition, requests may also be sent to computer system 12 from internal users (e.g., from a command console or by another appropriate access method), external or third parties, other automated applications, as well as any other appropriate entities, individuals, systems, or computers.

Computer system 12 includes an interface used according to particular needs, desires, or particular implementations of computer system 12 and/or system 10. The interface is used by computer system 12 for communicating with other systems in a distributed environment, including within the system 10, connected to the network (whether illustrated or not). Generally, the interface comprises logic encoded in software and/or hardware in a suitable combination and operable to communicate with the network. More specifically, the interface may comprise software supporting one or more communication protocols associated with communications such that the network or interface's hardware is operable to communicate physical signals within and outside of the illustrated system 10.

Although single processor 16 is illustrated in FIG. 1, two or more processors may be used according to particular needs, desires, or particular implementations of computer system 12 and/or the system 10. Generally, processor 16 executes instructions and manipulates data to perform the operations of computer system 12.

Memory 18 that holds data for computing device 20 and/or other components of the system 10. Although illustrated as a single memory 18 in FIG. 1, two or more memories may be used according to particular needs, desires, or particular implementations of computer system 12 and/or the system 10. While memory 18 is illustrated as an integral component of computer system 12, in alternative implementations, memory 18 can be external to computer system 12 and/or the system 10.

An application in memory 18 comprises an algorithmic software engine providing functionality according to particular needs, desires, or particular implementations of computer system 12 and/or the system 10, particularly with respect to functionality required for processing data. In addition, although illustrated as integral to computer system 12, in alternative implementations, the application can be external to computer system 12 and/or the system 10.

There may be any number of computers associated with, or external to, the system 10 and communicating over network. Further, the terms "client," "user," and other appropriate terminology may be used interchangeably, as appropriate, without departing from the scope of this disclosure. Moreover, this disclosure contemplates that many users may use one computing device 20, or that one user may use multiple computing device 20.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA).

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frame-works, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

The following publications are incorporated herein by reference:

[1] V. Mulwad, T. Finin, and A. Joshi, "Generating linked data by inferring the semantics of tables." in *Proceedings of the 1st International Workshop on Searching and Integrating New Web Data Sources—Very Large Data Search (VLDS)*, 2011, pp. 17-22.

[2] X. Yin, W. Tan, and C. Liu, "FACTO: a fact lookup engine based on web tables," in *Proceedings of the 20th International Conference on World Wide Web, WWW* 2011, Hyderabad, India, March 28-Apr. 1, 2011, 2011, pp. 507-516.

[3] S. K. Jauhar, P. D. Turney, and E. H. Hovy, "*Tables as semi-structured knowledge for question answering,*" in *Proceedings of the 54th Annual Meeting of the Association for Computational Linguistics, ACL* 2016, Aug. 7-12, 2016, Berlin, Germany, Volume 1: Long Papers, 2016.

[4] H. Sun, H. Ma, X. He, W. Yih, Y. Su, and X. Yan, "Table cell search for question answering," in *Proceedings of the 25th International Conference on World Wide Web, WWW* 2016, Montreal, Canada, Apr. 11-15, 2016, 2016, pp. 771-782.

[5] E. Crestan and P. Pantel, "Web-scale table census and classification," in *Proceedings of the Forth International Conference on Web Search and Web Data Mining,* 2011, pp. 545-554.

[6] D. W. Embley, M. Hurst, D. Lopresti, and G. Nagy, "Table-processing paradigms: a research survey," *International Journal of Document Analysis and Recognition (IJDAR)*, vol. 8, no. 2-3, pp. 66-86, 2006.

[7] M. F. Hurst, "The interpretation of tables in texts," Ph.D. dissertation, University of Edinburgh, 2000.

8] H.-H. Chen, S.-C. Tsai, and J.-H. Tsai, "Mining tables from large scale html texts," in *Proceedings of the 18th Conference on Computational Linguistics—Volume* 1, ser. COLING '00. Stroudsburg, Pa., USA: Association for Computational Linguistics, 2000, pp. 166-172.

[9] G. Penn, J. Hu, H. Luo, and R. T. McDonald, "Flexible web document analysis for delivery to narrow-bandwidth devices," in *6th International Conference on Document Analysis and Recognition (ICDAR* 2001), 10-13 Sep. 2001, Seattle, Wash., USA, 2001, pp. 1074-1078.

[10] Y. Wang and J. Hu, "A machine learning based approach for table detection on the web," in *Proceedings of the Eleventh International World Wide Web Conference*, 2002, pp. 242-250.

[11] M. J. Cafarella, A. Y. Halevy, Y. Zhang, D. Z. Wang, and E. Wu, "Uncovering the relational web," in *11th International Workshop on the Web and Databases*, 2008.

[12] J. Eberius, K. Braunschweig, M. Hentsch, M. Thiele, A. Ahmadov, and W. Lehner, "Building the dresden web table corpus: A classification approach," in *International Symposium on Big Data Computing*, 2015, pp. 41-50.

[13] M. J. Cafarella, J. Madhavan, and A. Y. Halevy, "Web-scale extraction of structured data," *SIGMOD Record*, vol. 37, no. 4, pp. 55-61, 2008. [Online]. Available: http://doi.acm.org/10.1145/1519103.1519112

[14] O. Lehmberg, D. Ritze, R. Meusel, and C. Bizer, "A large public corpus of web tables containing time and context metadata," in *Proceedings of the 25th International Conference on World Wide Web*, 2016, pp. 75-76.

[15] L. R. Lautert, M. M. Scheidt, and C. F. Dorneles, "Web table taxonomy and formalization," *SIGMOD Record*, vol. 42, no. 3, pp. 28-33, 2013.

[16] M. Yoshida and K. Torisawa, "A method to integrate tables of the world wide web," in *Proceedings of the International Workshop on Web Document Analysis (WDA 2001)*, 2001, pp. 31-34.

[17] A. Tengli, Y. Yang, and N. L. Ma, "Learning table extraction from examples," in *Proceedings of the 20th International Conference on Computational Linguistics*, ser. COLING '04. Stroudsburg, Pa., USA: Association for Computational Linguistics, 2004.

[18] J. Fang, P. Mitra, Z. Tang, and C. L. Giles, "Table header detection and classification," in *Proceedings of the Twenty-Sixth AAAI Conference on Artificial Intelligence*, Jul. 22-26, 2012, Toronto, Ontario, Canada., 2012.

[19] P. D. Turney and P. Pantel, "From frequency to meaning: Vector space models of semantics," *Journal of artificial intelligence research*, vol. 37, pp. 141-188, 2010.

[20] K. W. Church and P. Hanks, "Word association norms, mutual information, and lexicography," *Computational linguistics*, vol. 16, no. 1, pp. 22-29, 1990.

[21] J. A. Bullinaria and J. P. Levy, "Extracting semantic representations from word co-occurrence statistics: A computational study," *Behavior research methods*, vol. 39, no. 3, pp. 510-526, 2007.

[22] S. F. Chen and J. Goodman, "An empirical study of smoothing techniques for language modeling," *Computer Speech & Language*, vol. 13, no. 4, pp. 359-394, 1999.

[23] M. Hall, E. Frank, G. Holmes, B. Pfahringer, P. Reutemann, and I. H. Witten, "The weka data mining software: an update," *SIGKDD Explorations*, vol. 11, no. L pp. 10-18, 2009.

[24] H. Zhang, "The optimality of naive bayes," in *Proceedings of the Seventeenth International Florida Artificial Intelligence Research Society Conference*, Miami Beach, Fla., USA, 2004, pp. 562-567. [Online]. Available: http://www.aaai.org/Library/FLAIRS/2004/flairs04-097.php

[25] K. Heafield, "KenLM: faster and smaller language model queries," in *Proceedings of the EMNLP 2011 Sixth Workshop on Statistical Machine Translation*, Edinburgh, Scotland, United Kingdom, July 2011, pp. 187-197. [Online]. Available: http://kheafield.com/professional/avenue/kenlm.pdf

[26] T. Mikolov, M. Karafiat, L. Burget, J. Cernocky, and S. Khudanpur, "Recurrent neural network-based language model." in *Proceedings of Interspeech*, 2010.

The invention claimed is:

1. A computer-implemented vector space model method for detecting attribute value pairs from corpus data using a computer comprising a processor and a computer readable medium comprising instructions executable by the processor to at least:

receive the corpus data comprising at least one attribute value pair;

detect a layout template of the at least one attribute value pair;

measure the merit of the layout template by determining at least one of (a) relative magnitudes of content probabilities based on a probability of the contents of an attribute cell and a probability of a corresponding value cell, (b) validity of a name-value pair, or (c) the pointwise mutual information of a frequency matrix M corresponding to a sparse vector capturing context information of a word; and output detected attribute value pairs.

2. The computer-implemented method of claim 1, wherein the relative magnitudes of content probabilities are determined by a scoring function S( ):

$$S(a) = \log \frac{P(x_{att})}{P(x_{val})}$$

where $P(x_{att})$ is the probability of the contents of the attribute cell and $P(x_{val})$ is the probability of the corresponding value cell.

3. The computer-implemented method of claim 1, wherein the validity of the name value pair is determined by a step function S( ):

$$S(a) = \begin{cases} 1 & \text{if } P(x_{att}) > P(x_{val}) \\ 0 & \text{otherwise} \end{cases}$$

where $P(x_{att})$ is the probability of the contents of the attribute cell and $P(x_{val})$ is the probability of the corresponding value cell.

4. The computer-implemented method of claim 1, wherein the pointwise mutual information is determined by a step function S( ):

$$S(a) = \begin{cases} 1 & \text{if } PMI(x_{att}, x_{val}) > 0 \\ 0 & \text{otherwise} \end{cases}$$

where $x_{att}$ and $x_{val}$ are two table cells being paired.

5. The computer-implemented method of claim 4, wherein the attribute value pair corresponds to at least one of a pair of words, table cells and text phrases.

6. A computer-implemented method for extracting data from data-bearing tables, using a computer comprising a processor and a computer readable medium comprising instructions executable by the processor to at least:

acquire at least one data-bearing table comprising a plurality of rows and a plurality of columns of data values;

assign at least one table layout template for the at least one data-bearing table;

generate a set of attribute value pairs, $A^c$, for the at least one table layout template;

compute a content score, $W_{content}$ defining a percentage of likely attribute-value pairs for the at least one table layout template;

compute a template score, $W_{template}$ based on attribute-value pairs and word frequencies for the at least one table layout template;

determine whether content score, $W_{content}$ is greater than a threshold associated with a percentage of likely attribute value pairs;

when content score, $W_{content}$ is greater than the threshold, identify a most suitable at least one table layout template for the at least one data-bearing table based on the template score, $W_{template}$ and output a set of attribute value pairs.

7. The computer-implemented method of claim 6, wherein the table layout is at least one of a relation layout, an entity layout and an other layout.

8. The computer-implemented method of claim 7, wherein the relation layout comprises at least one attribute name found in a first row of the plurality of rows.

9. The computer-implemented method of claim 7, wherein the entity layout comprises at least one attribute name found in a first column of the plurality of columns.

10. The computer-implemented method of claim 7, wherein the other layout comprises at least one of a matrix and mixed formats.

11. An apparatus for extracting data from data-bearing tables using a vector space model, the apparatus comprising at least one processor, a computer readable medium comprising instructions executable by the at least one processor to cause the processor, the apparatus comprising:

a dataset acquisition module for acquiring at least one data-bearing table from a data source, the at least one data-bearing table comprising a plurality of rows and a plurality of columns of data values;

a categorizer for assigning at least one table layout template for the at least one data-bearing table;

an attribute generator for generating a set of attribute value pairs, $A^c$, for the at least one table layout template;

a table quality analyzer for computing a content score, $W_{content}$ defining a percentage of likely attribute-value pairs for the at least one table layout template; for computing a template score, $W_{template}$ based on attribute-value pairs and word frequencies for the at least one table layout template;

a classification module for identifying a most suitable at least one table layout template for the at least one data-bearing table based on the template score, $W_{template}$ and a relationship between the content score, $W_{content}$ and a threshold associated with a percentage of likely attribute value pairs, and output a set of attribute value pairs.

12. The apparatus of claim 11, wherein the table layout is at least one of a relation layout, an entity layout and an other layout.

13. The apparatus of claim 11, wherein the relation layout comprises at least one attribute name found in a first row of the plurality of rows.

14. The apparatus of claim 11, wherein the entity layout comprises at least one attribute name found in a first column of the plurality of columns.

15. The apparatus of claim 11, wherein the other layout comprises at least one of a matrix and mixed formats.

16. The apparatus of claim 11, wherein a merit of the at least one layout template by determining at least one of (a) relative magnitudes of content probabilities based on a probability of the contents of an attribute cell and a probability of a corresponding value cell, (b) validity of a name-value pair, or (c) pointwise mutual information of a frequency matrix M corresponding to a sparse vector capturing context information of a word; and output detected attribute value pairs.

17. The apparatus of claim 16, wherein the relative magnitudes of content probabilities are determined by a scoring function S( ):

$$S(a) = \log \frac{P(x_{att})}{P(x_{val})}$$

where $P(x_{att})$ is the probability of the contents of the attribute cell and $P(x_{val})$ is the probability of the corresponding value cell.

18. The apparatus of claim 16, wherein the validity of the name value pair is determined by a step function S( ):

$$S(a) = \begin{cases} 1 & \text{if } P(x_{att}) > P(x_{val}) \\ 0 & \text{otherwise} \end{cases}$$

where $P(x_{att})$ is the probability of the contents of the attribute cell and $P(x_{val})$ is the probability of the corresponding value cell.

19. The apparatus of claim 16, wherein the pointwise mutual information is determined by a step function S( ):

$$S(a) = \begin{cases} 1 & \text{if } PMI(x_{att}, x_{val}) > 0 \\ 0 & \text{otherwise} \end{cases}$$

where $x_{att}$ and $x_{val}$ are two table cells being paired.

20. The apparatus of claim 16, wherein the attribute value pair corresponds to at least one of a pair of words, table cells and text phrases.

* * * * *